BISTABLE TRANSISTOR COINCIDENCE GATE

Filed Aug. 13, 1954

J. G. LINVILL
R. L. WALLACE JR.
BY Harry C. Hart
ATTORNEY

United States Patent Office 2,831,126

Patented Apr. 15, 1958

2,831,126

BISTABLE TRANSISTOR COINCIDENCE GATE

John G. Linvill, Whippany, and Robert L. Wallace, Jr., Plainfield, N. J., assignors to Bell Telephone Laboratories, Incorporated, New York, N. Y., a corporation of New York Application August 13, 1954, Serial No. 449,543

7 Claims. (Cl. 307—88.5)

Figure 1:
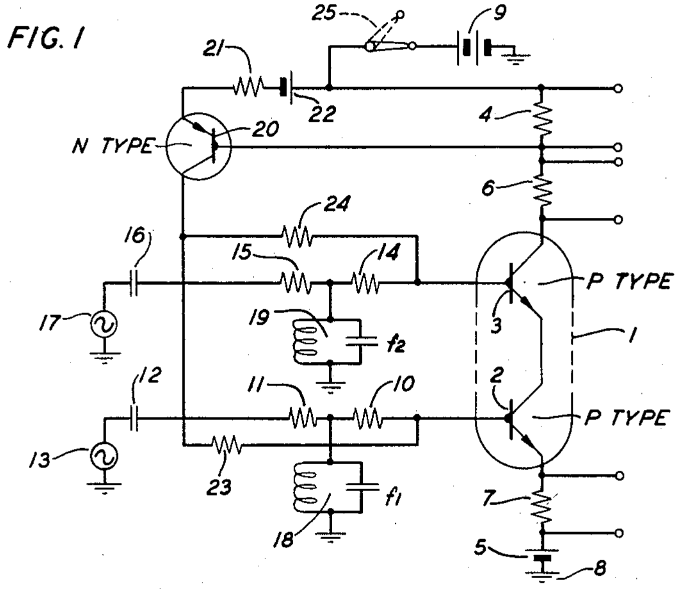

This invention relates to switching circuits and has for its principal object to provide a positive, unambiguous and enduring response to the concurrent brief application of two or more selected control signals and under no other conditions. A more general object is to provide a coincidence or And gate of improved performance. A more specific object is to endow such a gate with memory.

The invention attains these objects in the following fashion:

Two transistors of like conductivity type are interconnected with a potential source, two independent input terminals and a common load in a fashion to provide an output current in the load when, and only when, actuating control signals are applied to the input terminals. In one form, which is preferred for its simplicity, the emitter-collector current paths of the two transistors are connected in series between the operating potential source and the load, the input terminals being connected to their respective base electrodes. With this arrangement, as long as either one of the transistors is in its cut-off condition no current flows through the load. Only when actuating signals are applied concurrently to both input terminals does the path from the potential source through the load become of sufficiently low impedance to permit load current to flow in significant amounts. Without more, the load current terminates on the removal of either or both of the actuating signals. Thence, this combination constitutes a coincidence or And gate.

In some situations it is desired to establish a new circuit condition immediately upon the simultaneous occurrence of two or more selected input signals which may be of brief duration and to maintain this new condition after the termination of such input signals. An example is found in the establishment of a telephone voice current path in response to multifrequency switching signals. To secure such a result it is necessary to endow the coincidence gate with a holding feature or memory. This is provided, in accordance with the invention, by the connection of a third transistor of conductivity type opposite to that of the two transistors which constitute the gate, intercoupled with them in a fashion to provide regenerative feedback of network currents in a sense and with a magnitude to maintain the low resistance path condition which was established in the foregoing fashion after the influence which caused it may have ceased. The original nonconducting condition may then be restored at will by the momentary operation of an auxiliary switch.

The two transistors which constitute the coincidence gate may be embedded in a single envelope to form a single multiple transistor, in which case the emitter electrode of one component constitutes the emitter electrode of the composite unit, the collector electrode of the other component constitutes the collector electrode of the composite unit, and the base electrodes of the several components constitute the independent base electrodes of the multiple unit, while the collector electrode of one component is connected directly to the emitter electrode of the other component, inside the envelope of the composite unit, this connection being thus not accessible.

If preferred, a single multiple zone junction transistor may be substituted for such a composite unit or for the plurality of individual three electrode transistors of which it is formed.

The invention envisions a coincidence gate comprising any number, e. g., 3 or more, of three-electrode transistors of the first kind, or of an equivalent composite or multiple zone unit, connected to provide a coincidence gate which shall respond to the coincidence of a like number of input signals and to no other condition. Likewise it envisions the combination with such transistors of the first kind, or such multiple unit, of a further transistor of opposite kind intercoupled with all the transistors or components of the first kind in the fashion described above to hold the condition established by the transient input signals.

Figure 2:
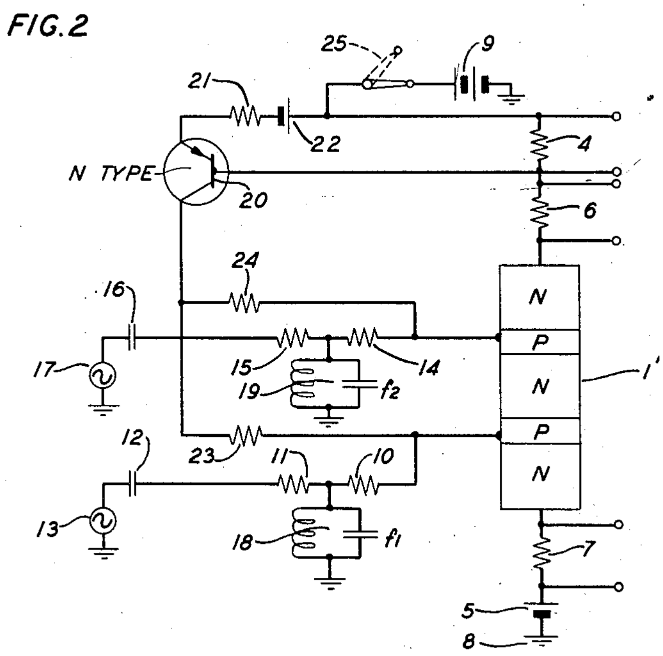

The invention will be fully apprehended from the following detailed description of preferred illustrative embodiments thereof, taken in connection with the appended drawings in which:

Fig. 1 is a schematic circuit diagram illustrating the invention as applied to a composite transistor, comprising a plurality of three-electrode transistors; and Fig. 2 is a schematic circuit diagram illustrating the invention as applied to a single multiple zone junction transistor .

Referring now to the drawings, Fig. 1 shows a multiple four-electrode transistor 1 comprising a first P-type three-electrode component transistor 2 having an emitter electrode, a base electrode and a collector electrode, and a second P-type three-electrode component transistor 3 having an emitter electrode, a base electrode and a collector electrode, the collector electrode of the first component being directly connected to the emitter electrode of the other component. The electrodes of the component transistors are indicated by conventional symbols. The remaining connections, and the operation of the combination, are the same, whether the component three-electrode transistors be embedded in a single envelope to constitute a composite transistor 1 or not.

The emitter-collector paths of these two transistors 2, 3 are connected in series through a feedback resistor 4 and a bias battery 5, and preferably, too, through a self bias resistor 6 and a load resistor 7, between ground 8 and the positive terminal of an operating potential source 9. The base electrode of the lower transistor 2 is connected through padding resistors 10, 11 and a blocking condenser 12 to one terminal of an alternating current signal source 13. Similarly the base electrode of the upper transistor 3 is connected through padding resistors 14, 15 and a blocking condenser 16 to one terminal of an alternating current signal source 17. The other terminal of each of these sources 13, 17 may be connected to ground. A frequency-selective voltage-supporting filter 18, which in a simple form may comprise merely a coil and a condenser connected in parallel, interconnects the junction point of the two resistors 10, 11 with ground. These elements are proportioned to be resonant at a frequency $f_1$. Likewise another selective voltage-supporting filter 19 which may comprise a coil and a condenser connected in parallel interconnects the junction point of the two upper resistors 14, 15 with ground. These elements are proportioned to be resonant at a frequency $f_2$.

With this circuit, in the absence of signals of the frequencies $f_1$ and $f_2$, the base electrode of each P-type transistor 2, 3, is maintained by the bias battery 5 at a potential which is negative with respect to the potential of its emitter electrode by an amount which is sufficient to hold the transistor in its cut-off condition. Hence the impedance of its emitter-collector circuit is very high;

substantially no current flows through the load 7, and substantially the entire voltage of the operating potential source 9 appears across the two transistors 2, 3 being divided equally between them.

When the base electrode of either transistor 2, 3 is made slightly positive with respect to its emitter electrode, the resistance of its emitter-collector path is greatly reduced and, provided there is no other high impedance in series current flows through the load. But when such a positive bias is applied only to one of the two base electrodes, the impedance of the emitter-collector path of the other transistor, which is still biased at or below cut off by the battery, remains high; sufficiently high, indeed, to support substantially the entire voltage of the operating potential source 9. Hence the flow of current in the load 7 is prevented.

When, however, the base electrodes of both transistors 2, 3 are thus positively biased, both of the emitter-collector paths become of low impedance and current proceeds to flow in the load 7. Under this condition the voltages across the transistors are greatly reduced and the voltage of the potential source 9 is concentrated to a large extent on the two series resistors 4, 6.

In one practical case of interest the signal-controlled alterations in the potentials of the base electrodes of the two transistors 2, 3 are derived from the alternating signals of the sources 13, 17 which pass through the blocking condensers 12, 16 and are rectified by virtue of the fact that each transistor 2, 3 is adjusted at or near cut off, so that a signal voltage swing of one sign drives the transistor to which it is applied further beyond cut off, while a signal voltage swing of opposite sign drives the transistor into its conducting condition and causes current to flow in the emitter-base path. Selective response of this character to signals of a particular frequency is easily provided by the connection of the tuned circuits 18, 19 in the fashion shown. Each of these tuned circuits acts to shunt alternating signals of all frequencies but the desired one to ground, permitting only the desired one to reach the base electrode in substantial strength.

Without more, the load current would cease upon the removal of the actuating signal from either of the two base electrodes. In accordance with the invention the load current is held "on" by the employment of a third transistor 20 of conductivity type opposite that of the first two; in the present example, N-type. Its emitter electrode is connected by way of a protective resistor 21 and a small bias battery 22 to the positive terminal of the potential source 9. Its collector electrode is connected by way of a padding resistor 23 to the base electrode of the first P-type transistor 2 and similarly by way of another padding resistor 24 to the base electrode of the second P-type transistor 3. Its base electrode is connected to the junction point of the feedback resistor 4 and the self bias resistor 6. The operation of the combined circuit is as follows:

As long as either one of the first two transistors 2, 3 is cut off, substantially the entire voltage of the potential source 9 appears across the other. If both of them are cut off, this voltage is divided equally between them. Under either of these conditions the third transistor 20 is held in its cut-off condition by the bias battery 22. Only when both of the first two transistors 2, 3 are together driven into their conducting conditions, by the application of the signals to their base electrodes in the fashion described above, does a substantial voltage appear across the feedback resistor 4. This resistor is so proportioned that, when this condition occurs, the voltage drop across it offsets the bias voltage of the battery 22 on the third transistor 20, whereupon current commences to flow in the collector electrode circuit of the latter. This current flows through the padding resistors 23, 24 to the base electrodes of the first two transistors 2, 3. By reason of the employment of a semiconductor of opposite conductivity type for the third transistor 20, its collector current flows in a sense such as to hold the base electrodes of the first two transistors 2, 3 positive; namely, at potentials which support and maintain the low impedance condition of the first two transistors 2, 3 and so maintain the load current. The collector voltage necessary to maintain the collector current of the third transistor 20 is conveniently supported by the voltage drop across the self bias resistor 6, due to the flow of load current. This "on" condition may now be terminated at will by operation of a switch 25.

Fig. 2 shows a modification of Fig. 1 in which the two cooperative transistors designated 1 are replaced by a multiple zone transistor 1'. With semiconductor materials for the several zones of this transistor as shown its operation is similar to that of two P-type transistors having their emitter-collector circuits connected in series, or to a composite transistor having the same electrode connections. Hence it may serve as a coincidence gate when interconnected with a potential source and a load and when supplied with actuating signals to its two base electrodes in the same fashion as that described above. Hence, too, the holding action may be provided by the combination therewith of an additional N-type three-electrode transistor. Because of the similarity between the actuating and holding circuits in the two cases, corresponding elements of the two figures are designated by like reference characters.

In the illustrative examples shown, an individual resistor is included to serve as a load. However, if preferred, output power may be drawn either from the feedback resistor or from the self-bias resistor, in which case the separate load resistor may be dispensed with.

With a reversal of the conductivity type of each transistor (and, with a multiple zone transistor, this is accomplished by a reversal of the conductivity type of each zone), and a corresponding reversal of the polarity of each potential source, the operation is unchanged.

What is claimed is:

1. The combination which comprises a multiple transistor element of one conductivity type, having an emitter electrode, a collector electrode and at least two independent base electrodes, said transistor element defining a current path from said emitter electrode to said collector electrode of which the conductance is independently controllable by potentials applied to said base electrodes, a series circuit comprising a source of operating potential, a load impedance element and said current path, a signal source connected to each of said base electrodes thereby to supply controlling potentials to said base electrodes, and an additional transistor of conductivity type, opposite to that of said multiple transistor element, having a control circuit comprising a base electrode coupled to said series circuit and having a collector electrode, connected to the base electrodes of said multiple transistor element, thereby, when actuated, to supply sustaining potentials to said base electrodes.

2. The combination which comprises a multiple transistor element of one conductivity type, having an emitter electrode, a collector electrode and at least two independent base electrodes, said transistor element defining a current path from said emitter electrode to said collector electrode of which the conductance is independently controllable by potentials applied to said base electrodes, a series circuit comprising a source of operating potential, a feedback impedance element and said current path, a signal source connected to each of said base electrodes to supply controlling potentials thereto, and an additional transistor of opposite conductivity type connected to supply, when actuated, sustaining potentials to the base electrodes of said multiple transistor element, said additional transistor element having an actuation circuit comprising a base electrode, connections for deriving a voltage from said feedback impedance element, and means for coupling said voltage to said actuation circuit.

3. The combination which comprises a multiple transistor element of one conductivity type, having an emitter electrode, a collector electrode and at least two independent base electrodes, a current path extending from said emitter electrode to one terminal of a potential source and including a load impedance element, a current path extending from said collector electrode to the other terminal of said potential source and including a feedback impedance element, means for normally biasing said base electrodes to or below cut off, a first signal source connected to one of said base electrodes, a second signal source connected to the other of said base electrodes, whereby a current flows in said load and a voltage drop appears across said feedback element when, and only when, signals of said signal sources are applied to said base electrodes in time coincidence, an additional transistor having an emitter electrode, a collector electrode and a base electrode and being of conductivity type opposite to that of said multiple transistor element, means for normally biasing said additional transistor below cut off, a connection from the collector electrode of said additional transistor to each of the base electrodes of said multiple transistor element, and connections for applying the voltage drop which appears across said feedback element as a bias-offsetting signal to the emitter and base electrodes of said additional transistor, whereby said load current is maintained after the termination of the signals of said sources.

4. The combination defined in claim 3 wherein the multiple transistor element comprises a plurality of three-electrode transistors, the collector electrode of each, other than the last, being directly connected to the emitter electrode of the next, other than the first.

5. The combination defined in claim 3 wherein the multiple transistor element comprises a semiconductor body having a plurality of contiguous zones of successively opposite conductivity types.

6. The combination defined in claim 3 wherein the multiple transistor element comprises a semiconductor body having a plurality of contiguous zones of successively opposite conductivity types, the emitter electrode being connected to one end zone of said plurality, the collector electrode being connected to the opposite end zone of said plurality, and the several base electrodes being connected respectively, to nonadjacent intermediate zones.

7. The combination which comprises two transistors of a first conductivity type having individual input terminals and having output terminals coupled in series with a common load whereby an output current is delivered to said load upon, and only upon, the coincident application of input signals to said input terminals, and a third transistor, of conductivity type opposite to that of said two first-named transistors, having a control terminal coupled to the output terminals of said two first-named transistors and having an output terminal regeneratively coupled to the input terminals of said two first-named transistors whereby an output current delivered to said load is maintained after the removal of said coincident signals.

References Cited in the file of this patent

UNITED STATES PATENTS

| | | |
|---|---|---|
| 2,569,347 | Shockley | Sept. 25, 1951 |
| 2,627,039 | MacWilliams | Jan. 27, 1953 |
| 2,676,271 | Baldwin | Apr. 20, 1954 |